US009716527B2

(12) United States Patent
Xie et al.

(10) Patent No.: US 9,716,527 B2
(45) Date of Patent: Jul. 25, 2017

(54) METHOD AND DEVICE FOR THE ANALYSIS OF CODE DOMAIN POWER AND CODE DOMAIN ERROR POWER

(75) Inventors: Feng Xie, Munich (DE); Said Habrih, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 13/130,556

(22) PCT Filed: Oct. 2, 2009

(86) PCT No.: PCT/EP2009/007090
§ 371 (c)(1),
(2), (4) Date: May 20, 2011

(87) PCT Pub. No.: WO2010/060501
PCT Pub. Date: Jun. 3, 2010

(65) Prior Publication Data
US 2011/0228694 A1    Sep. 22, 2011

(30) Foreign Application Priority Data
Nov. 25, 2008  (DE) .................. 10 2008 058 823

(51) Int. Cl.
*H04B 1/707*  (2011.01)
*H04B 17/23*  (2015.01)
*H04B 17/327*  (2015.01)

(52) U.S. Cl.
CPC ............. *H04B 1/707* (2013.01); *H04B 17/23* (2015.01); *H04B 17/327* (2015.01)

(58) Field of Classification Search
USPC .................. 370/252, 320, 335, 342, 441
See application file for complete search history.

(56) References Cited

U.S. PATENT DOCUMENTS

| 2002/0102985 | A1* | 8/2002 | Amalfitano et al. .......... 455/453 |
| 2003/0025704 | A1* | 2/2003 | Bryant et al. ................. 345/581 |
| 2003/0039264 | A1 | 2/2003 | Hando |
| 2004/0032897 | A1* | 2/2004 | Kuntz et al. .................. 375/130 |
| 2004/0039763 | A1 | 2/2004 | Koizumi |

(Continued)

FOREIGN PATENT DOCUMENTS

| JP | 6-142071 A | 5/1994 |
| JP | 2006135541 A | 5/2006 |

OTHER PUBLICATIONS

English Translation of International Preliminary Report on Patentability mailed Jun. 30, 2011, in corresponding International Application No. PCT/EP2009/007090, filed Oct. 2, 2009.

(Continued)

*Primary Examiner* — Hassan Phillips
*Assistant Examiner* — Saba Tsegaye
(74) *Attorney, Agent, or Firm* — Christensen O'Connor Johnson Kindness PLLC

(57) ABSTRACT

Method and apparatus for simultaneously showing Code Domain Power and Code Domain Error Power for various code channels by receiving a signal, evaluating the signal, ascertaining a Code Domain Power for a code channel, ascertaining a Code Domain Error Power for the code channel, and simultaneously showing the Code Domain Power and the Code Domain Error Power.

6 Claims, 4 Drawing Sheets

(56) References Cited

U.S. PATENT DOCUMENTS

| | | |
|---|---|---|
| 2004/0213173 A1 | 10/2004 | Franke |
| 2005/0111396 A1* | 5/2005 | Kim .............................. 370/318 |
| 2005/0166269 A1* | 7/2005 | Tononi ................. C12Q 1/6883 800/3 |

OTHER PUBLICATIONS

Birgenheier, R.A., "Overview of Code-Domain Power, Timing, and Phase Measurements," Hewlett-Packard Journal 47(1):73-93, Feb. 1996.

International Search Report mailed Jan. 22, 2010, in corresponding International Application No. PCT/EP2009/007090, filed Oct. 2, 2009, 2 pages.

Notification of the Second Office Action, mailed Nov. 12, 2013, issued in related Chinese Application No. 200980147230.8, filed Oct. 2, 2009, 23 pages.

\* cited by examiner

METHOD AND DEVICE FOR THE ANALYSIS OF CODE DOMAIN POWER AND CODE DOMAIN ERROR POWER

CROSS-REFERENCE TO RELATED APPLICATIONS

This application is the National Stage under 35 USC 371 of International Application No. PCT/EP2009/007090, filed Oct. 2, 2009, which claims priority to German Application No. 102008058823.7, filed Nov. 25, 2008.

FIELD OF THE DISCLOSURE

The invention relates to a method and a device for the analysis of Code Domain Power (CDP) and Code Domain Error Power (CDEP).

BACKGROUND

U.S. Pat. No. 7,162,396 B2 discloses a device for the display of Code Domain Power (CDP) measured results. The device displays the measured results in the form of bars in a diagram. The diagram provides a horizontal axis and a vertical axis, wherein code channels and spreading factors are plotted on the horizontal axis, and a measurement for the power is plotted on the vertical axis. The height of a bar indicates the power of a code channel. By contrast, its position on the horizontal axis indicates the code channel and the spreading factor. As an alternative to the power of an active code channel, the noise of an inactive code channel can also be displayed in the diagram. However, a Code Domain Error Power (CDEP) is not displayed. Accordingly, the error with which an active code channel is affected is not evident. In particular, the ratio in which the error stands to the power is not evident. In particular, it is not possible to compare the error with the power.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The invention is therefore based on the object of providing a method and a device, with which a comparison of Code Domain Power (CDP) and Code Domain Error Power (CDEP) of a channel is possible.

The method according to the invention for the analysis of Code Domain Power (CDP) and Code Domain Error Power (CDEP) of different code channels comprises a reception of at least one signal, an evaluation of the signal, a determination of at least one Code Domain Power (CDP) of at least one code channel, a determination of at least one Code Domain Error Power (CDEP) of the code channel and simultaneous display of the Code Domain Power (CDP) and the Code Domain Error Power (CDEP) of at least one channel.

For this purpose, the device according to the invention for the simultaneous display of Code Domain Power (CDP) and Code Domain Error Power (CDEP) of different code channels comprises a device for the reception of a signal, a device for the evaluation of the signal, a device for determining a Code Domain Power (CDP) of a code channel, a device for determining a Code Domain Error Power (CDEP) of the code channel and a device for the simultaneous display of the Code Domain Power (CDP) and the Code Domain Error Power (CDEP).

A signal to be measured, for example, a CDMA signal of a base station, is received by the device for the reception of a signal and measured by the device for the measurement of the signal. The measurement is evaluated by the device for the evaluation of the signal. From the evaluation of the signal, a Code Domain Power (CDP) of a code channel is determined by means of the device for determining a Code Domain Power (CDP) of a code channel. For this code channel, a Code Domain Error Power (CDEP) of the code channel is determined by means of the device for determining a Code Domain Error Power (CDEP). The determined Code Domain Power (CDP) and the determined Code Domain Error Power (CDEP) are displayed simultaneously by means of the device for the simultaneous display of the Code Domain Power (CDP) and the Code Domain Error Power (CDEP).

The simultaneous display allows a simple overview of the relationships between Code Domain Power (CDP) and Code Domain Error Power (CDEP) of a code channel. A comparison of both values is accordingly made possible and facilitated. The type of display can be selected from various types. For example, different scales and/or colors etc. can be selected and matched to a user or application.

The dependent claims present advantageous embodiments of the method according to the invention and respectively the device according to the invention.

By preference the Code Domain Power (CDP) and the Code Domain Error Power (CDEP) are each determined from the same time slot of the evaluated signal. Accordingly, the determined Code Domain Power (CDP) and the determined Code Domain Error Power (CDEP) are actually associated with one another and derived from the same data basis. Moreover, it is possible in this manner to update the actually associated data at a faster rate. For this purpose, the device for determining the Code Domain Power (CDP) and the device for determining the Code Domain Error Power (CDEP) are preferably set up in such a manner that the Code Domain Power (CDP) and the Code Domain Error Power (CDEP) can each be determined from the same time slot of the evaluated signal.

By preference, the Code Domain Error Power (CDEP) is determined on the basis of one of several respectively selectable algorithms (for example, directly by a user and/or indirectly through a program by means of a device for the selection of an algorithm). These can be stored in a buffer and loaded as required. The selection takes place, for example, through a user entry on the basis of which the algorithm is loaded. In this context, the selection is especially independent of the determination of the algorithm for determining the Code Domain Power.

In this manner, it is possible to select the algorithm and adapt it to an application and/or a specific user interest. For this purpose, the device for determining the Code Domain Error Power (CDEP) is set up in such a manner that the Code Domain Error Power (CDEP) can be determined on the basis of one of several respectively selectable algorithms. By preference, the device for the simultaneous display of Code Domain Power (CDP) and Code Domain Error Power (CDEP) also comprises for this purpose a device for selecting the algorithm.

By preference, the Code Domain Power (CDP) and the Code Domain Error Power (CDEP) are displayed in a diagram with a horizontal x-axis and a vertical y-axis, the Code Domain Power (CDP) is displayed by a first bar in the positive y-direction with a first scale, the Code Domain Error Power (CDEP) is displayed by a second bar in the negative y-direction with a second scale, and the first bar and the second bar are placed opposite one another. Accordingly, a simple and logically arranged, simultaneous display of actually associated data (CDP & CDEP) is made possible. For this purpose, the device for the simultaneous display of the Code Domain Power (CDP) and the Code Domain Error Power (CDEP) is preferably set up in such a manner that the Code Domain Power (CDP) and the Code Domain Error Power (CDEP) can be displayed in a diagram with a horizontal x-axis and a vertical y-axis, the Code Domain Power (CDP) can be displayed by a first bar in the positive y-direction with a first scale, the Code Domain Error Power (CDEP) can be displayed by a second bar in the negative y-direction with a second scale, and the first bar and the second bar can be placed opposite to one another.

By preference, the first scale and/or the second scale are adjusted individually, that is to say, independently of one another. Through this adjustability, the scales and the size of the display of the individual data (CDP & CDEP) can be adjusted in a user-defined manner. Accordingly, the display can be enlarged if a user wants to identify a precise value more accurately, and reduced, if a user does not want the precise value to dominate the overall display. For this purpose, the device for simultaneous display of Code Domain Power (CDP) and Code Domain Error Power (CDEP) of different code channels is preferably set up in such a manner that the first scale and/or the second scale can be adjusted independently of one another.

By preference, a Code Domain Power (CDP) of an I-branch and/or a Code Domain Power (CDP) of a Q-branch is determined as the Code Domain Power (CDP). In this manner, a more detailed display of the power structure of a total signal which is subdivided into signal components, is possible.

For this purpose, the device for determining the Code Domain Power (CDP) is set up in such a manner that a Code Domain Power (CDP) of an I-branch is determinable as the Code Domain Power (CDP). The device for determining the Code Domain Error Power (CDEP) is set up in such a manner that a Code Domain Power (CDP) of a Q-branch is determinable as the Code Domain Power (CDP).

DESCRIPTION OF THE DRAWINGS

A preferred exemplary embodiment of the method according to the invention for the simultaneous display of Code Domain Power (CDP) and Code Domain Error Power (CDEP) is shown in the drawings and explained in greater detail in the subsequent description. The drawings are as follows.

DETAILED DESCRIPTION

Figure 1:
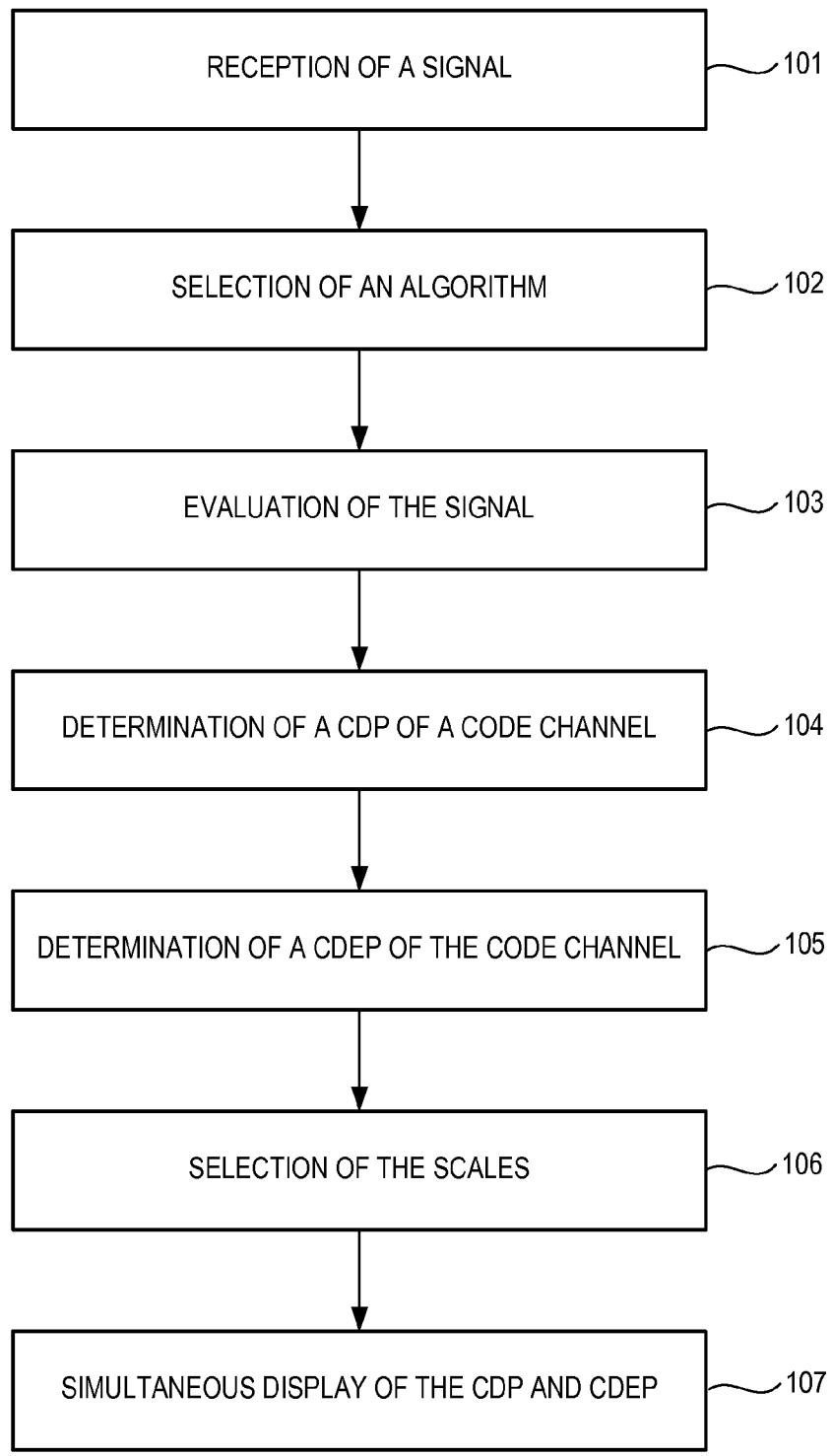
FIG. 1 shows a flow chart of the method according to the invention for the analysis of Code Domain Power (CDP) and Code Domain Error Power (CDEP)
Figure 2:
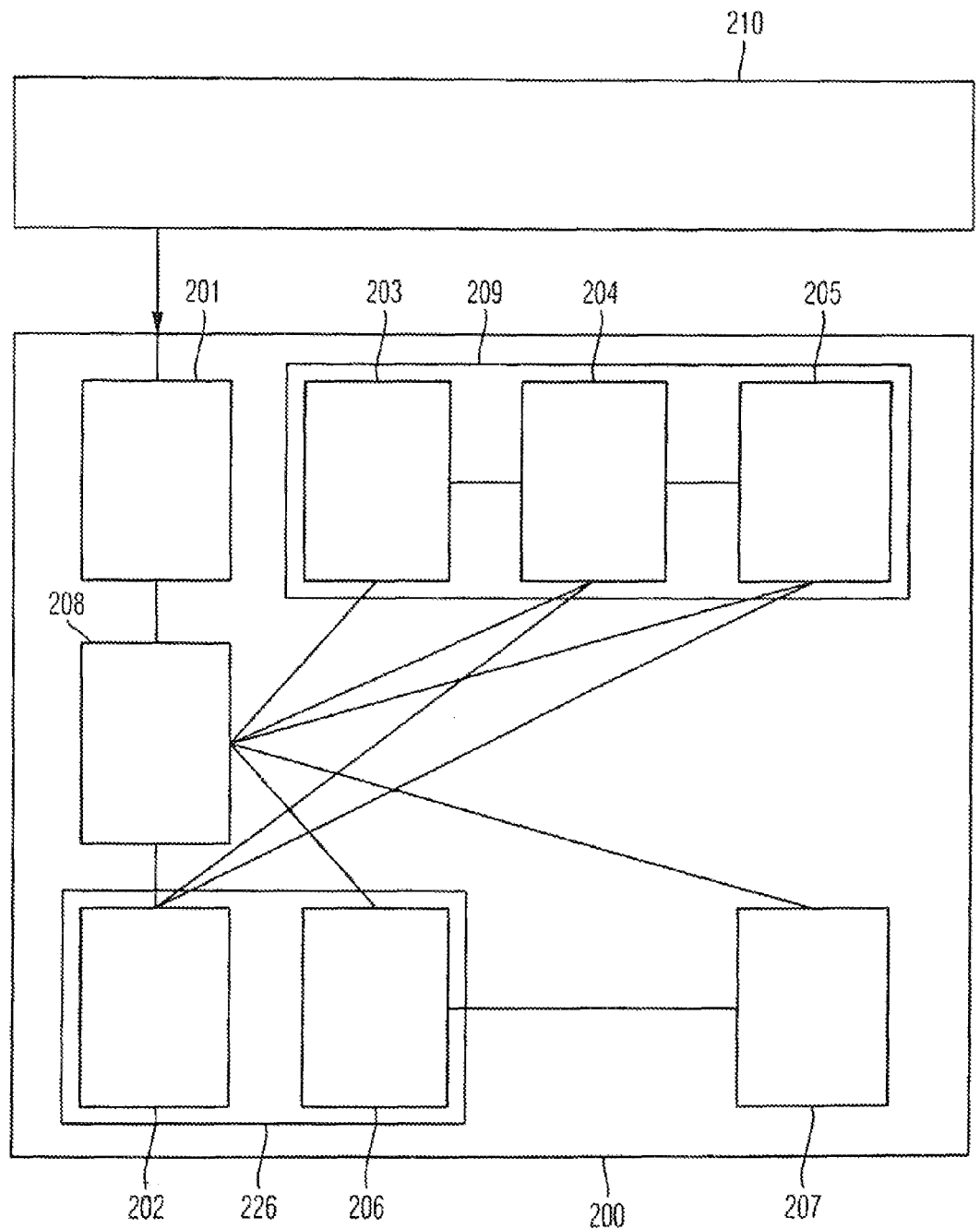
FIG. 2 shows a block-circuit diagram of the device according to the invention for the analysis and simultaneous display of Code Domain Power (CDP) and Code Domain Error Power (CDEP)

FIG. 1 and FIG. 2 show a flow chart of an exemplary embodiment of the method according to the invention and respectively a block-circuit diagram of an exemplary embodiment of the device according to the invention.

The method according to the invention for the simultaneous display of Code Domain Power (CDP) and Code Domain Error Power (CDEP) of different code channels comprises several steps 101-107. The device 200 according to the invention for the simultaneous display of Code Domain Power (CDP) and Code Domain Error Power (CDEP) of different code channels comprises for this purpose several devices for the implementation of the steps 101-107. The device 200 according to the invention for the analysis and simultaneous display of Code Domain Power (CDP) and Code Domain Error Power (CDEP) comprises a reception device 201 for a reception (measurement/sampling in the time domain), mixing down from the high frequency range and low-pass filtering of a CDMA signal of a base station 210. The signal processed in this manner is buffered in a buffer 208. Furthermore, the measuring device 200 contains a first determination device 202 for determining an algorithm with which the further evaluation is to be implemented, an evaluation device 203 for the evaluation of the signal with the algorithm determined, a second determination device 204 for determining the Code Domain Power (CDP) of a code channel, a third determination device 205 for determining a Code Domain Error Power (CDEP) of the code channel (preferably simultaneously during the determination of the CDP or after the determination of the CDP), a fourth determination device 206 for determining a scale, and a display device 207 for the simultaneous display of the Code Domain Power (CDP) and the Code Domain Error Power (CDEP). The first determination device 202 and the fourth determination device 206 are contained in a control device 226. The evaluation device 203, the second determination device 204 and the third determination device 205 are contained in a control device 209, which can be operated by a user for the control of the device 200 according to the invention.

The buffer 208 is connected to all of the devices 201-207 of the devices 200 according to the invention for a data exchange. Moreover, the first determination device 202 and the second determination device 204, and also the first determination device 202 and the third determination device 205, and also the fourth determination device 206 and the display device 207, and also the evaluation device 203 and the second determination device 204, and also the second determination device 204 and the third determination device 205 are connected to one another in each case for a data or information exchange. The buffer 208 buffers both measured results and also the data which are generated and/or processed by the devices which are connected to the buffer 208. In particular, the buffer 208 buffers the selectable algorithms and the software for the control of the display device 207.

The device according to the invention comprises, for communication with a user, a display (207) or screen (207) and an input port, for example, for a keyboard, a mouse and/or keys and rotary knobs on a front panel of the device 200 according to the invention, which are connected to the control device 226.

The method begins with the reception 101 of at least one signal, preferably a CDMA signal of a base station 210, by means of the reception device 201 for the reception of the signal. For the evaluation of the signal, an algorithm is determined 102 by means of a first determination device 202; for example, through selection from a set of algorithms, which are stored in the buffer 208. The signal is evaluated 103 in an evaluation device 203 for the evaluation of the signal. From the evaluated signal, at least one Code Domain Power (CDP) of the code channel is determined 104 by means of a second determination device 204 for determining a Code Domain Power (CDP) of a code channel. The CDP measurement analyses the power distribution via the individual code channels. Moreover, a Code Domain Error Power (CDEP) of the code channel is determined 105 from the evaluated signal by means of a third determination device 205, preferably by means of the determined algorithm. The CDEP is an analysis of the error signal in the code range, that is to say, the projection of the error power onto the individual code channels. For the formation of the display of the Code Domain Power (CDP) and of the Code Domain Error Power (CDEP), scales for the display are preferably determined 106, for example, through selection by means of a fourth determination device for the determination and respectively selection of scales 206. This can be implemented automatically by a program and/or in an active manner by a user. The determined Code Domain Power (CDP) and the determined Code Domain Error Power (CDEP) are displayed simultaneously 107 by means of a display device 207 for the simultaneous display of the Code Domain Power (CDP) and the Code Domain Error Power (CDEP).

The simultaneous display 107 makes possible and facilitates the overview of the value ratios between Code Domain Power (CDP) and Code Domain Error Power (CDEP) of a code channel. The method of display is selected between various options. For example, special scales and/or colours and/or fields and/or edges of fields and/or bar widths are selected. The display is adapted, for example, to a given application, either automatically and dependent upon the Code Domain Power (CDP) and/or upon the Code Domain Error Power (CDEP), or selected actively by a user.

In one exemplary embodiment, the Code Domain Power (CDP) and the Code Domain Error Power (CDEP) are determined 104, 105 respectively from the same time slot of the evaluated signal. This ensures that the determined Code Domain Power (CDP) and the determined Code Domain Error Power (CDEP) are actually associated with one another, that is to say, are derived from the same data basis. Since both values can be determined from one time interval, it is not necessary to use two time intervals, which would either lead to an unnecessarily long time interval or to an excessively small sampling value of the measured values in order to determine values of CDP and CDEP which would then not actually be associated with one another. In this manner, it is possible to update the actually associated data at a faster rate with an acceptable sampling size of the measured values.

The second determination device 204 for determining the Code Domain Power (CDP) and the third determination device 205 for determining the Code Domain Error Power (CDEP) are designed for this purpose in such a manner that the Code Domain Power (CDP) and the Code Domain Error Power (CDEP) are each determinable on the basis of measured values of a single time interval or respectively time slot of the evaluated signal. For this purpose, the devices 204 and 205 use common data from an evaluation device 203 for the evaluation of the signal.

The Code Domain Error Power (CDEP) is preferably determined on the basis of an algorithm, which can be selected 105 from a set of several respectively selectable algorithms. The device for the simultaneous display of Code Domain Power (CDP) and Code Domain Error Power (CDEP) preferably comprises for this purpose a first selection device 202 for the selection of the algorithm. A user selects the algorithm directly or indirectly from an assortment of possible algorithms. For the direct selection, the user indicates which type of Code Domain Error Power (CDEP) is to be determined.

The type of display of Code Domain Power (CDP) and Code Domain Error Power (CDEP) is also selected automatically or by a user. By preference, the Code Domain Power (CDP) and the Code Domain Error Power (CDEP) are displayed in an x-y diagram with horizontal x-axis and vertical y-axis. The Code Domain Power (CDP) is displayed by a first bar of a first colour in the positive y-direction with a first scale. Similarly, the Code Domain Error Power (CDEP) is preferably displayed by a second bar of a second colour in the negative y-direction with a second scale. The first bar and the second bar are preferably disposed opposite one another. By preference, the first scale and/or the second scale are adjusted independently of one another. The width of the bars, the first colour and a second colour are also selectable in each case. Instead of being disposed opposite one another, the bars can optionally, that is to say, also in a selectable manner, be disposed side-by-side. Instead of bars, simple lines can be selected and used. In each case, the selection actions are preferably implemented respectively through or by means of the fourth selection device 206 for the selection of the scales. A simple and logically arranged simultaneous display of actually associated data (CDP & CDEP) is then made possible in principle and also capable of flexible modification, for example, by a user. The modifiable display described is implemented 107 by means of the display device 207 for the simultaneous display of the Code Domain Power (CDP) and the Code Domain Error Power (CDEP).

A Code Domain Power (CDP) of an I-branch and/or a Code Domain Power (CDP) of a Q-branch is preferably determined as the Code Domain Power (CDP). A Code Domain Error Power (CDEP) is determined respectively for every Code Domain Power (CDP), whether it is from the I-branch or from the Q-branch. For every CDP, a CDEP corresponding to it, that is, associated with it, is determined. These associated CDP and CDEP can each be displayed as described above. In this manner, a complete display of the power structure (distribution of the total power between the individual channels and branches) of a total signal, which is subdivided into signal components (channels and branches), is possible. The second determination device 204 for determining the Code Domain Power (CDP) is set up in such a manner that a Code Domain Power (CDP) of an I-branch and/or of an Q-branch is determinable as the Code Domain Power (CDP).

Figure 3:
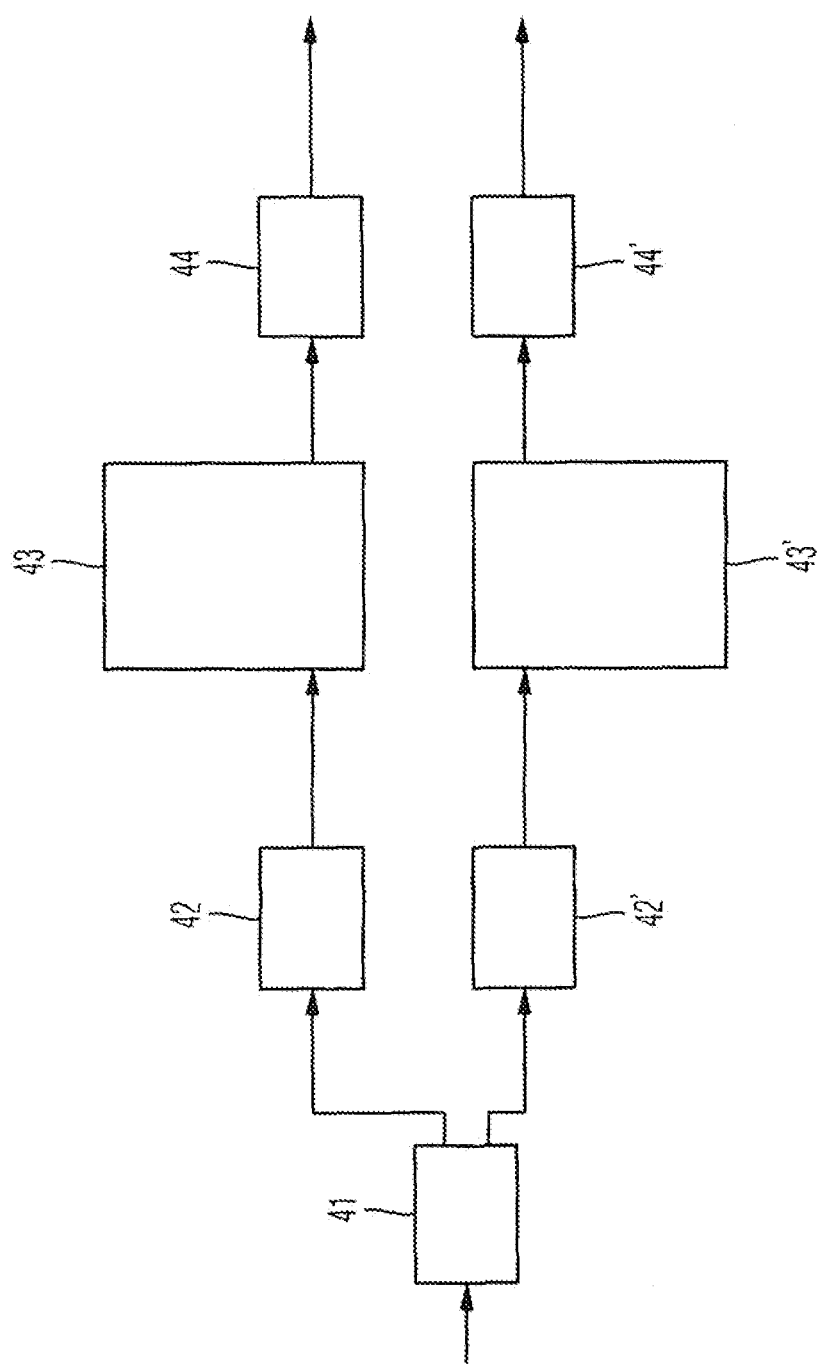
FIG. 3 shows the structure of a second determination device for determining a Code Domain Power (CDP) of a code channel.

FIG. 3 shows how the second determination device 204 determines 104 a Code Domain Power (CDP) of a code channel. The second determination device 204 comprises an I/Q demodulator 41, a first filter 42, a second filter 42', a first processor 43, a second processor 43', a first CDP calculator 44 and a second CDP calculator 44'. The I/Q demodulator 41 splits the signal into an I signal, which is rerouted to the first filter 42, and a Q-signal, which is rerouted to the second filter 42'. In each case, the first filter 42 and the second filter 42' reroute amplitude information and phase information from the received signals to the first processor 43 and respectively to the second processor 43'. The first processor 43 and the second processor 43' decode and despread the received signals and reroute the results to the first CDP calculator 44 or respectively to the second CDP calculator 44'. The first CDP calculator 44 and the second CDP calculator 44' calculate the Code Domain Power (CDP) of the I-signal (I-branch) or of the Q-signal (Q-branch).

Figure 4:
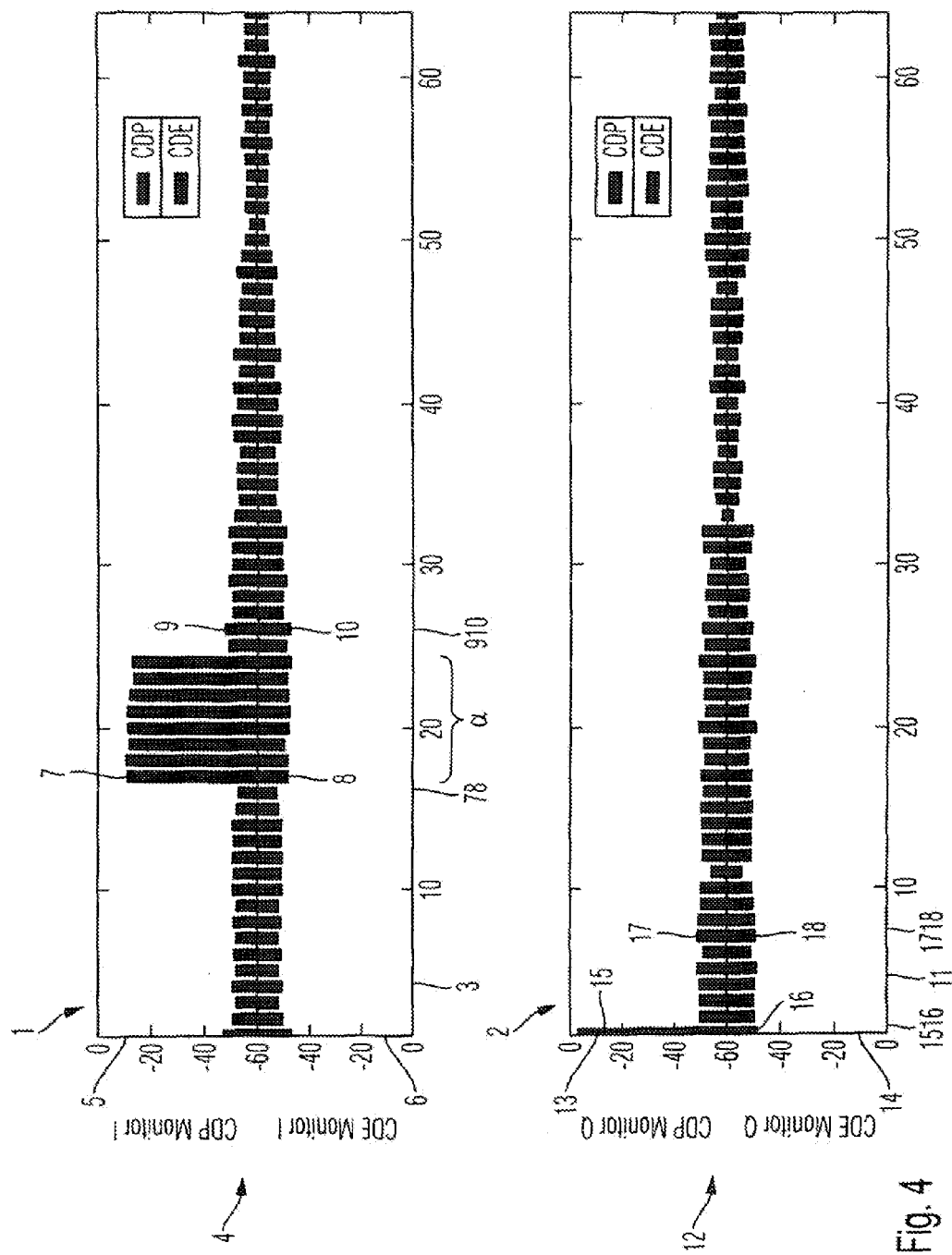
FIG. 4 shows a preferred display of Code Domain Power (CDP) and Code Domain Error Power (CDEP) by means of the method according to the invention and respectively by means of the device according to the invention.

FIG. 4 shows a display of CDP values and CDEP values in the form of bars in bar diagrams, which are determinable by means of the described exemplary embodiment of the method according to the invention, which can be implemented by means of the described exemplary embodiment of the device according to the invention.

In a first diagram 1, a horizontal, first x-axis 3 and a vertical, first y-axis 4 are illustrated. Code channels are arranged on the horizontal first x-axis 3. The vertical first y-axis is subdivided into a first portion 5 and a second portion 6. The first portion 5 provides the first scale for the display of CDP values. The second portion 6 provides the scale for the display of CDEP values. In each case, a CDP and an associated CDEP for a first active code channel 78 and also for a first inactive code channel 910 are displayed in the first diagram 1. The first active code channel 78 provides a first CDP in the form of a first bar 7 and a first CDEP in the form of a second bar 8. The first inactive code channel 910 provides a second CDP in the form of a third bar 9 and a second CDEP in the form of a fourth bar 10. The first active code channel 78 is contained within a group of active code channels.

Instead of a display of the individual powers of the channels of the group of active code channels, which are allocated, for example, in each case to a common superordinate code channel of relatively lower spreading factor, a total power for the group of active code channels can be displayed in the form of a single bar. For this total power for the group of active code channels, an associated CDEP can also be determined (for example, by summation of the individual CDPs) and displayed in the form of a further single bar. The total power for the group of active code channels is determined in a similar manner for the power of a single code channel. The method described and the device described can accordingly be used in a similar manner for the total power CDP( ) and a CDEP (CDP( )) associated with it, or respectively for their determination and display.

In a similar manner, a horizontal second x-axis 11 and a vertical second y-axis 12 are shown in a second diagram 2. The horizontal second x-axis 3 images code channels, while the vertical second y-axis is subdivided into a third portion 13 and a fourth portion 14, wherein the third portion 13 provides a third scale for the display of CDP values, and the fourth portion 14 provides a fourth scale for the display of CDEP values. In the second diagram 2, a CDP and also a CDEP allocated to the CDP are displayed for a second active code channel 1516 and also for a second inactive channel 1718 in each case, wherein the second active code channel 1516 provides a third CDP in the form of a fifth bar 15 and a third CDEP in the form of a sixth bar 16, and the second inactive code channel 1718 provides a fourth CDP in the form of a seventh bar 17 and a fourth CDEP in the form of the eighth bar 18.

The first diagram 1 and the second diagram 2 relate to the same code channels. In the first diagram 1, the CDP values and CDEP values associated with their I-branches are displayed for the code channels. By contrast, in the second diagram 2, the CDP values and the CDEP values associated with their Q-branches are shown for the code channels. In both diagrams 1, 2, each CDP is disposed opposite to its associated CDEP.

By preference, the value −128 dB is allocated to the zero point of the y-axis, while the first portion 5, the second portion 6, the first portion 13 and the fourth portion 14 extend outwards from this zero point up to 0 dB. By preference, a common scale is used for both y-axis directions in both diagrams 1, 2 respectively. Alternatively, other negative values can be allocated to the zero point. The length of the portions (5, 6, 13, 14) is variable.

FIG. 4 shows how the second determination device 204 determines 104 a Code Domain Power (CDP). The second determination device 204 comprises an I/Q-demodulator 41, a first filter 42, a second filter 42', a first processor 43, a second processor 43', a first CDP calculator 44 and a second CDP calculator 44'. The I/Q-demodulator 41 splits the signal into an I-signal, which is rerouted to the first filter 42, and a Q-signal, which is rerouted to the second filter 42'. The first filter 42 and the second filter 42' reroute amplitude information and phase information from the respectively received signals in each case to the first processor 43 or to the second processor 43'. The first processor 43 and the second processor 43' decode and despread the received signals respectively and reroute the results to the first CDP calculator 44 or to the second CDP calculator 44'. The first CDP calculator 44 and the second CDP calculator 44' calculate the Code Domain Power (CDP) of the I-signal (I-branch) and respectively of the Q-signal (Q-branch). The inactive channels provide a noise power, which leads to the displayed bars.

The invention is not restricted to the exemplary embodiments displayed. On the contrary, individual features of the exemplary embodiments can also be advantageously combined with one another.

The invention claimed is:

1. A method for analyzing Code Domain Power and Code Domain Error Power of different code channels, comprising:
   receiving a signal, which is transmitted in a mobile-radio system operating according to a CDMA system;
   evaluating the signal;
   determining a Code Domain Power of a code channel;
   determining a Code Domain Error Power of the code channel; and
   simultaneously displaying the Code Domain Power and the Code Domain Error Power, wherein the Code Domain Error Power associated with one code channel and the Code Domain Power are displayed respectively in a manner allocated to one another, and wherein
   a Code Domain Power of an I-branch and a Code Domain Power of a Q-branch is determined as the Code Domain Power, and
   for every Code Domain Power of an I-branch and for every Code Domain Power of a Q-branch a corresponding Code Domain Error Power is determined, and
   the Code Domain Power of the I-branch and the associated Code Domain Error Power of the I-branch are displayed in a first diagram and the Code Domain Power of the Q-branch and the associated Code Domain Error Power of the Q-branch are displayed in a second diagram, wherein in each of the first diagram and the second diagram,
   the Code Domain Power and the Code Domain Error Power are displayed with a horizontal x-axis and a single vertical y-axis,
   the Code Domain Power is displayed through a first bar in a positive y-direction with the single y-axis having a first scale, the Code Domain Error Power is displayed through a second bar in a negative y-direction with the single y-axis having a second scale, the first bar and the second bar are allocated to the same position on the x-axis, the first scale of the single y-axis in the positive y-direction and the second scale of the single y-axis in the negative y-direction are adjusted and set independently from one another on the single y-axis of each diagram.

2. The method according to claim 1, wherein the Code Domain Power and the Code Domain Error Power are each determined from the same time slot of the evaluated signal.

3. The method according to claim 1, wherein the Code Domain Error Power is determined on the basis of one of several respectively selectable algorithms.

4. A device for simultaneous display of Code Domain Power and Code Domain Error Power of different code channels, comprising:

a reception device configured for the reception of a signal, an evaluation device configured for the evaluation of the signal, a second determination device configured for determining a Code Domain Power of a code channel, a third determination device configured for determining a Code Domain Error Power of the code channel, and a display device configured for the simultaneous display of the Code Domain Power and the Code Domain Error Power, a Code Domain Power of an I-branch and a Code Domain Power of a Q-branch are determined as the Code Domain Power, and for every Code Domain Power of an I-branch and for every Code Domain Power of a Q-branch a corresponding Code Domain Error Power is determined, wherein the display device for the simultaneous display of the Code Domain Power and the Code Domain Error Power is set up in such a manner that:

the Code Domain Power of the I-branch and the associated Code Domain Error Power of the I-branch are displayed in a first diagram and the Code Domain Power of the Q-branch and the associated Code Domain Error Power of the Q-branch are displayed in a second diagram, wherein in each of the first diagram and the second diagram;

the Code Domain Power and the Code Domain Error Power can be displayed in each diagram with a horizontal x-axis and a single vertical y-axis;

the Code Domain Power can be displayed through a first bar in the positive y-direction with the single y-axis having a first scale on the y-axis;

the Code Domain Error Power can be displayed through a second bar in the negative y-direction with the single y-axis having a second scale on the single y-axis; and the first bar and the second bar of the same position of the x-axis can be placed opposite one another; and the device for the simultaneous display of Code Domain Power and Code Domain Error Power of different code channels is set up in such a manner that the first scale of the single y-axis in the positive y-direction and the second scale of the single y-axis in the negative y-direction can be adjusted independently and are set independently from one another on the single y-axis of each diagram.

5. The device according to claim 4, wherein the second determination device for determining the Code Domain Power and the third determination device for determining the Code Domain Error Power are set up in such a manner that the Code Domain Power and the Code Domain Error Power can each be determined from the same time slot of the evaluated signal.

6. The device according to claim 4, wherein the third determination device for determining the Code Domain Error Power is set up in such a manner that the Code Domain Error Power can be determined on the basis of one of several respectively selectable algorithms.

\* \* \* \* \*